United States Patent [19]

Maltby, Jr. et al.

[11] Patent Number: 5,078,775
[45] Date of Patent: Jan. 7, 1992

[54] GLASS SHEET GAS SUPPORT

[75] Inventors: Robert E. Maltby, Jr., Wayne; Harold A. McMaster, Perrysburg; Philip J. Breno, Oregon; James W. Buckingham, Pemberville, all of Ohio

[73] Assignee: Glasstech, Inc., Perrysburg, Ohio

[21] Appl. No.: 671,499

[22] Filed: Mar. 19, 1991

[51] Int. Cl.$^5$ ............................................. C03B 25/04
[52] U.S. Cl. ................................... 65/182.2; 65/25.2; 65/273; 65/351; 65/354
[58] Field of Search ...................... 65/99.1, 182.2, 351, 65/354, 273, 274, 25.2

[56] References Cited

U.S. PATENT DOCUMENTS

| | | | |
|---|---|---|---|
| 3,264,720 | 8/1966 | Mott | 65/182.2 |
| 3,551,130 | 12/1970 | McMaster | 65/182.2 |
| 3,607,198 | 9/1971 | Mainier et al. | 65/182.2 |
| 3,756,797 | 9/1973 | Akeyoshi et al. | 65/25.2 |
| 4,200,446 | 4/1980 | Koontz | 65/25.2 |
| 4,249,928 | 7/1981 | Carleton | 65/182.2 |

Primary Examiner—Robert L. Lindsay
Attorney, Agent, or Firm—Brooks & Kushman

[57] ABSTRACT

A glass sheet gas support (20) is disclosed as having a set of elongated gas supply openings (26) for supplying pressurized gas to support a glass sheet and as also including a set of elongated gas exhaust openings (28) for exhausting the gas and constructed to including progressively increasing gas flow areas in opposite directions from ends (36) of each exhaust opening to a central portion (38) thereof in order to prevent gas pressure buildup between an upwardly facing surface (24) of the manifold and the supported glass sheet at a central location. In one embodiment, the manifold (22) defines each gas exhaust opening (28) with progressively increasing widths from its ends (36) toward the central portion (38) thereof and is preferably constructed as a cast refractory platen (42) which cooperates with a manifold member (58) that mounts gas jet pumps (60) fed products of combustion from a gas burner (62) to provide recirculating flow of gas to and from the supply exhaust openings. In another embodiment, the manifold (22') defines the ends (36') of each gas exhaust opening (28') with progressively increasing depths from its ends (36') toward the central portion (38') thereof and is preferably fabricated from sheet metal that defines both the gas supply and exhaust openings. Both manifold embodiments (20,22') include gas supply passages (96,96') that are inclined to provide conveyance of the supported glass sheet.

14 Claims, 3 Drawing Sheets

GLASS SHEET GAS SUPPORT

TECHNICAL FIELD

This invention relates to a gas sheet glass gas support for supporting a glass sheet in the form of either a continuous strip or a discrete sheet.

BACKGROUND ART

Gas supports have previously been utilized for many years to support a glass sheet such as a heated strip as it is conveyed from a forming station to an annealing lehr for annealing or a discrete sheet as it is conveyed subsequent to annealing for further processing such as bending, tempering or bending and tempering etc. Since there is no direct engagement with the glass with gas supports, better optical quality and greater mechanical strength is possible as comapred with glass sheets supported by rolls during hot conveyance. Gas supports have also previously included both supply and exhaust openings so that the pressurized gas supplied to support the glass sheet can be exhausted in order to prevent a gas pressure buildup below the supported glass sheet. In the past, the supply and exhaust openings have conventionally been constructed as a matrix of round openings interspersed with each other in a generally uniform pattern along the entire extent of the glass sheet support.

DISCLOSURE OF INVENTION

An object of the present invention is to provide an improved glass sheet gas support that is constructed so as to prevent gas pressure buildup below a supported glass sheet at a central location between lateral extremities of the glass sheet.

In carrying out the above and other objects of the invention, a glass sheet gas support constructed in accordance with the present invention includes a manifold having an upwardly facing surface including a set of gas supply openings and a set of gas exhaust openings. The gas supply openings feed pressurized gas upwardly to support a glass sheet above the surface and have elongated slit shapes including opposite ends between which the gas supply openings extend in a parallel relationship to each other and with a generally uniform width. The gas exhaust openings are located between the gas supply openings in an alternating relationship to receive and exhaust pressurized gas fed through the gas supply openings Each gas exhaust opening has an elongated slit shape including opposite ends and a central portion The gas exhaust openings extend generally parallel to each other and to the gas supply openings Each gas exhaust opening has exhaust gas flow areas that progressively increase in opposite directions from the ends toward the central portion thereof to thereby prevent gas pressure buildup between the upwardly facing manifold surface and the supported glass sheet at a central location between the ends of the openings.

In one embodiment, the manifold defines the ends of each gas exhaust opening with progressively increasing widths from its ends toward the central portion thereof to thereby provide the progressively increasing exhaust gas flow areas in the opposite directions toward the central portion of the gas exhaust opening. This embodiment is preferably constructed with the manifold as a molded refractory block in which the gas supply and exhaust openings are cast. As illustrated, the refractory manifold is constructed to include a platen that defines the supply and exhaust openings and to also include a manifold member that supplies the pressurized gas to the supply openings and receives the gas from the exhaust openings for recirculating flow. A gas jet pump is preferably utilized to provide the recirculating flow of the pressurized gas to and from the supply and exhaust openings. A gas burner of the gas support supplies pressurized and heated products of combustion to the gas jet pump as a primary gas flow with the gas from the exhaust openings providing a secondary gas flow that is induced by the primary gas flow to provide a mixed flow of heated and pressurized gas to the supply openings.

In the preferred construction of the one embodiment, the manifold member includes two pairs of spaced side walls. Each pair of spaced side walls defines a return passage for receiving gas from the exhaust openings, and a plurality of the gas jet pumps are mounted on each pair of spaced side walls. These gas jet pumps function to mix the pressurized and heated products of combustion received from the gas burner with the gas returned from the exhaust openings for the recirculating flow back to the supply openings The two pairs of spaced side walls are spaced from each other to define a mixing plenum in which pressurized gas is received from opposite directions from the gas jet pumps for mixing prior to being fed to the supply openings.

In another embodiment, the manifold of the glass sheet gas support defines the ends of each gas exhaust opening with progressively increasing depths from its ends toward the central portion thereof to thereby provide the progressively increasing exhaust gas flow areas of each exhaust opening in opposite directions from its ends toward the central portion of the exhaust opening This embodiment of the manifold is most preferably fabricated from sheet metal that defines the gas supply and exhaust openings.

Both embodiments of the manifold of the glass sheet gas support include gas supply passages that feed the gas supply openings and are inclined in a conveying direction transverse to the elongated directions of the gas supply and exhaust openings to provide conveyance of a glass sheet support by the manifold.

In a glass processing system disclosed, the gas manifold is also disclosed as being utilized with an upper manifold of the same construction but with the surface thereof that defines the gas and exhaust openings facing downwardly in a spaced and opposed relationship to the upwardly facing surface of the lower manifold. Each manifold includes at least one gas jet pump and a gas burner that supplies heated and pressurized products of combustion to the gas jet pump with the gas received from the exhaust openings providing a secondary gas flow that is induced by the primary gas flow to provide a mixed flow of heated and pressurized gas to the supply openings. The two manifolds thus cooperate to support a heated glass sheet therebetween in a spaced relationship to the surfaces of the manifolds.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
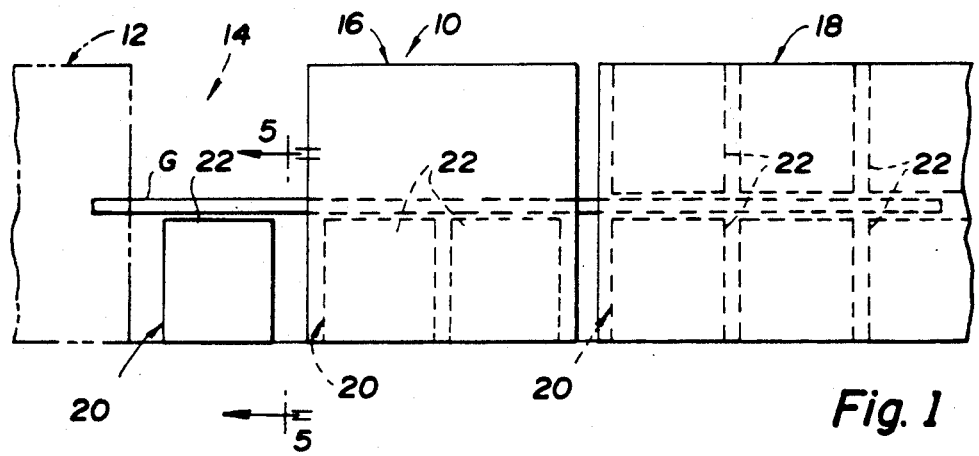
FIG. 1 is schematic side elevational view of a glass processing system including a glass sheet gas support constructed in accordance with the present invention.

With reference to FIG. 1 of the drawings, a glass sheet forming system generally indicated by 10 includes a forming station 12 for forming a glass sheet strip G, a delivery area 14 for delivering the heated glass sheet strip G from the forming station, a hot edge trimming station 16 for trimming lateral edges of the newly formed glass sheet strip G, and an annealing lehr 18 in which the glass sheet strip is annealed. Delivery area 14, the hot edge trimming station 16, and the annealing lehr 18 each include an associated glass sheet gas support 20 according to the present invention as is hereinafter more fully described. Both the delivery area 14 and the trimming station 16 each have the gas support 20 thereof constructed to include at least one lower manifold 22 for supporting the glass sheet strip G, while the annealing lehr 18 as is hereinafter more fully described has both lower and upper manifolds 22 that cooperate to support the glass sheet strip G. Furthermore, it should be appreciated that the gas support 20 can also be utilized to support discrete glass sheets as well as a continuous strip as illustrated.

Figure 2:
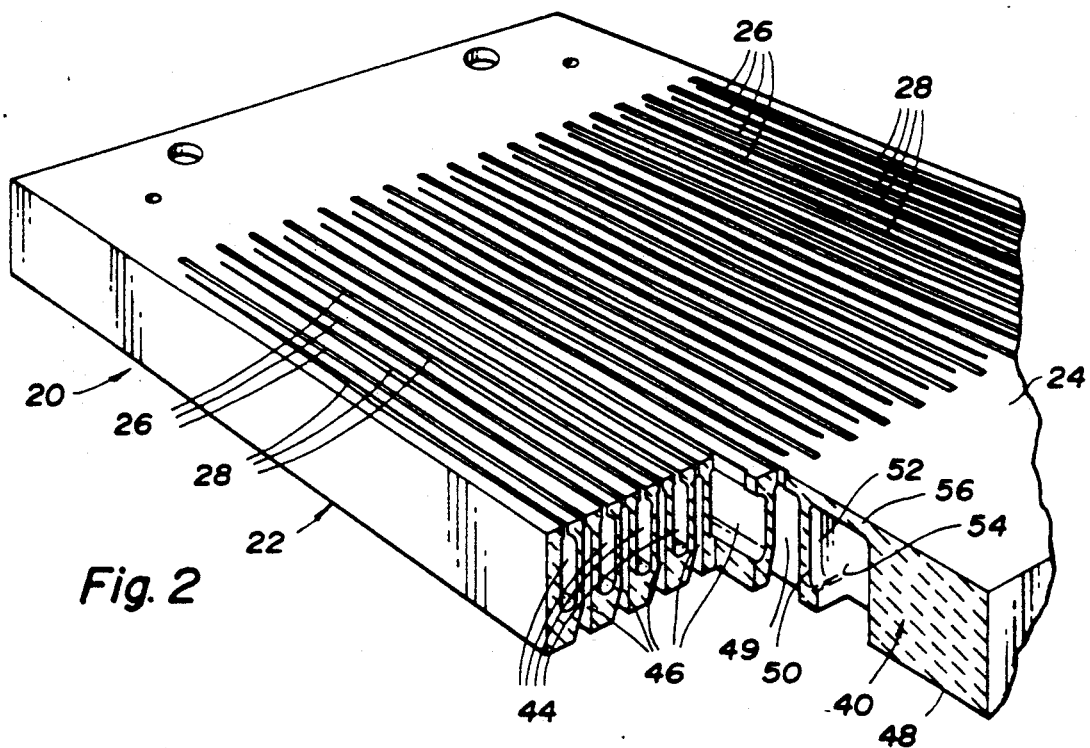
FIG. 2 is a partially broken away perspective view of a platen member of one embodiment of a manifold of the gas support.
Figure 3:
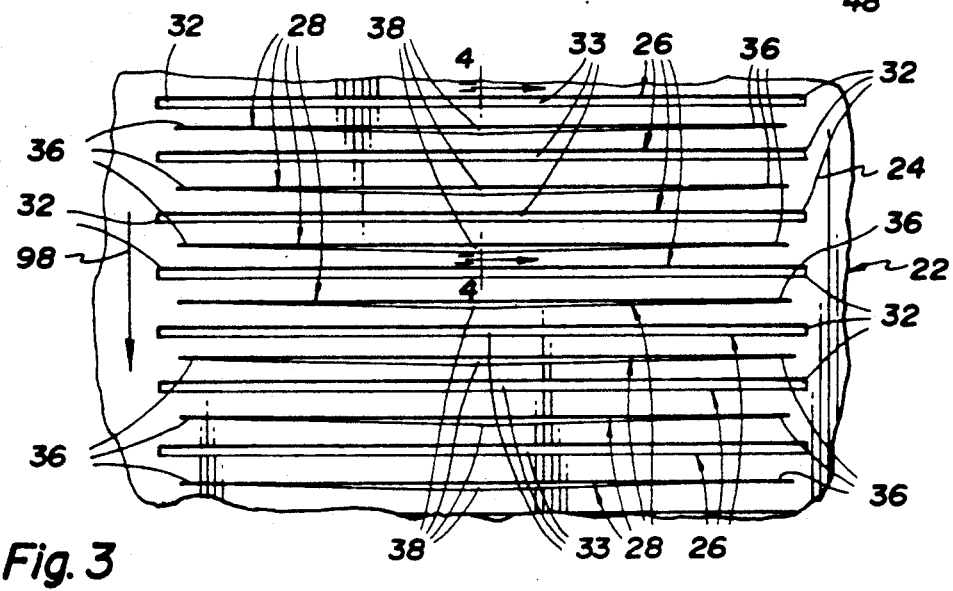
FIG. 3 is a top plan view of the manifold platen member for illustrating the construction of supply and exhaust openings that provide recirculating flow of pressurized gas for supporting a glass sheet by the manifold.
Figure 4:
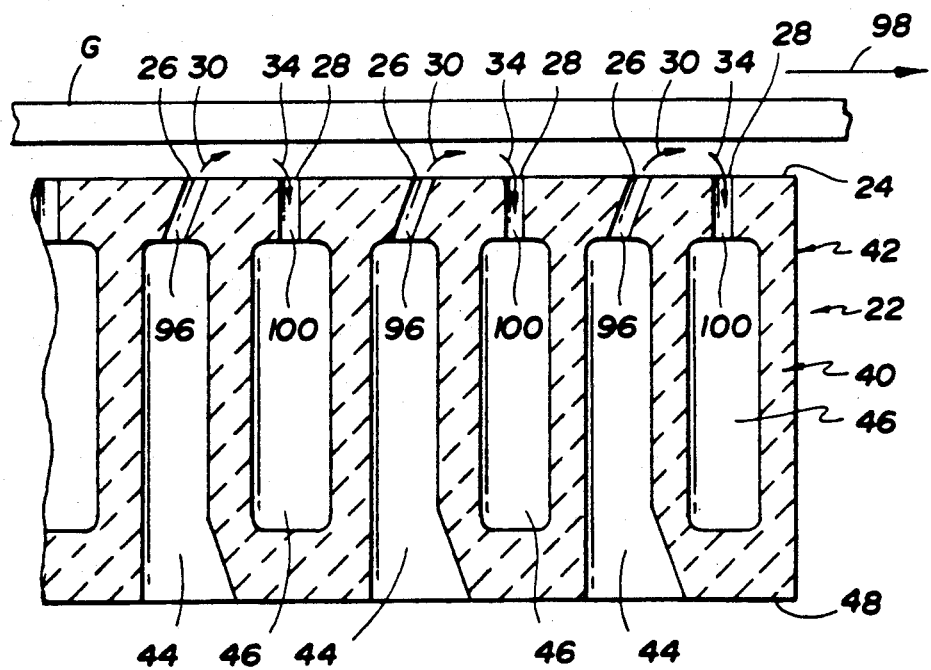
FIG. 4 is a sectional view taken along the direction of line 4—4 in FIG. 3 to illustrate the manner in which the pressurized gas is supplied and exhausted to support the glass sheet.

One embodiment of the manifold 22 of the gas support is illustrated in FIGS. 2 through 5 and has an upwardly facing planar surface 24 including a set of gas supply openings 26 and a set of gas exhaust openings 28. The gas supply openings 28 feed pressurized gas upwardly as shown by arrows 30 in FIG. 4 to support the glass sheet embodied by the strip G above the surface 24. The gas supply openings 26 as shown in FIG. 3 have elongated slit shapes including opposite ends 32 and central portions 33 between which the gas supply openings extend in a parallel relationship to each other and with a generally uniform width. The gas exhaust openings 28 are located between the gas supply openings 26 in an alternating relationship and as shown in FIG. 4 by arrows 34 receive and exhaust pressurized gas fed through the gas supply openings. Each gas exhaust opening 28 as shown in FIG. 3 has an elongated slit shape including opposite ends 36 and a central portion 38. Gas exhaust openings 28 extend generally parallel to each other and to the gas supply openings 26, and each gas exhaust opening 28 has exhaust gas flow areas that progressively increase in opposite directions from its ends 36 toward its central portion 38. This construction prevents gas pressure buildup between the upwardly facing manifold surface 24 and the supported glass sheet at a central location between the ends of the openings. More specifically, the greater exhaust area at the central location allows the pressurized gas fed through the supply openings 26 to escape through the central portion 38 of the adjacent exhaust opening 28 to a greater extent than at the ends 36 of the exhaust opening. This accommodates for pressurized gas that escapes laterally at the edge portions of the glass sheet adjacent the ends of the openings and thereby provides a generally uniform gas pressure over the entire width of the glass sheet between its opposite lateral edges.

In the embodiment illustrated in FIGS. 2 through 5, the manifold 22 defines the ends 36 of each gas exhaust opening 28 with progressively increasing widths from its ends 36 toward the central portion 38 thereof to thereby provide the progressively increasing exhaust gas flow area in opposite directions toward the central portion of the gas exhaust opening. More specifically, the manifold 22 illustrated has each exhaust opening 28 as shown in FIG. 3 provided with one side that is straight and another side that defines a blunt pointed shape that provides the progressively increasing widths from the ends 36 toward the central portion 38.

As best illustrated in FIGS. 2 and 3, the embodiment of the manifold 20 illustrated includes a molded refractory block 40 in which the gas supply and exhaust openings 26 and 28 are cast, most preferably from sinter bonded fused silica particles so as to have good resistance to thermal warpage. This cast block 40 provides a platen 42 of the manifold and defines plenum portions 44 as well as exhaust chambers 46 in addition to defining the upwardly facing surface 24 and the supply and exhaust openings 26 and 28. Each plenum portion 44 extends from a lower surface 48 of the platen member 42 as shown in FIG. 4 upwardly toward the associated gas supply opening 26 to supply the pressurized gas upwardly to the associated gas supply opening. As shown in FIG. 2, each plenum portion 44 has its opposite ends closed by end walls 50 that extend vertically between the upper surface 24 and the lower surface 48. Platen 42 as shown in FIG. 4 has its exhaust chambers 46 constructed to receive the gas from the associated exhaust openings 28 and, as shown in FIG. 2, each exhaust chamber 46 has opposite lateral ends 52 communicated with a return passage 54 whose upper extremity is closed by a top wall 56 and whose lower extremity is open.

Figure 5:
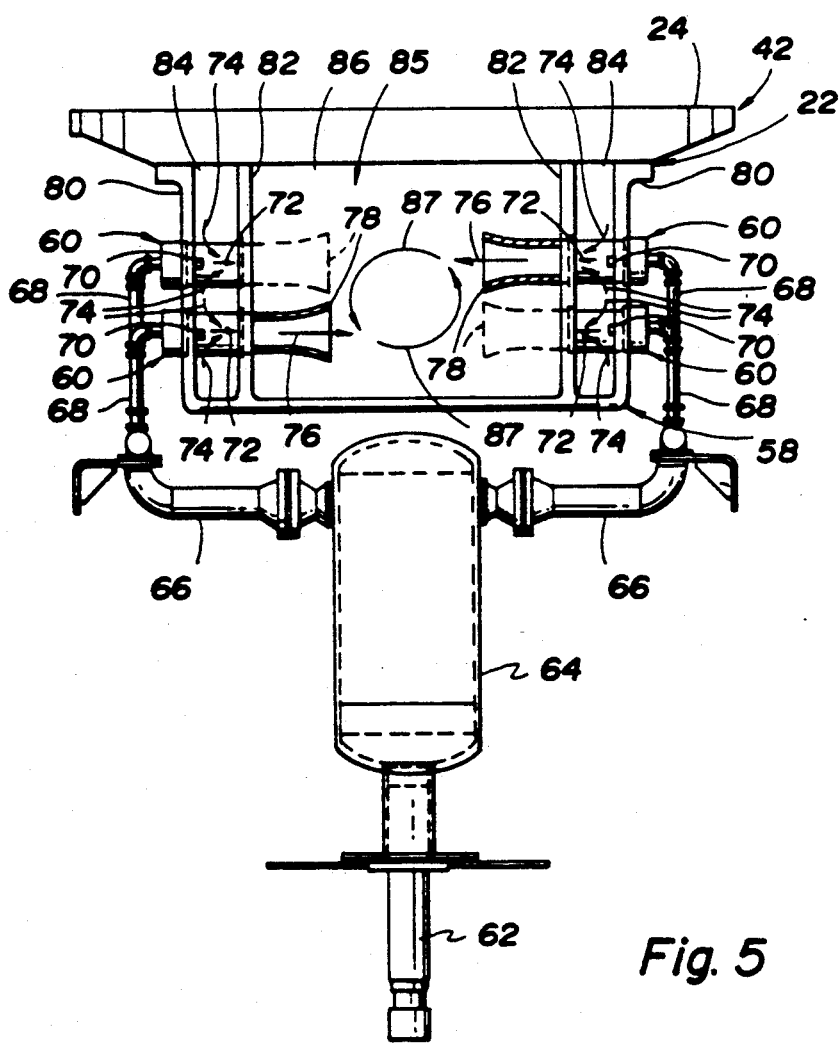
FIG. 5 is an elevational view taken in cross-section along the direction of line 5—5 in FIG. 1 to illustrate the recirculating flow that supports the glass sheet by the manifold.

As illustrated in FIG. 5, the manifold 22 in addition to including the platen member 42 also includes a manifold member 58 that is a cast refractory like the platen, most preferably from sinter bonded fused silica particles so as to have good resistance to thermal warpage. This manifold member 58 supplies the pressurized gas to the supply openings 26 of platen 42 and receives the gas from the exhaust openings 28 of the platen member for recirculating flow. The manifold 22 also include at least one gas jet pump 60 and preferably includes a plurality of the gas jet pumps as is hereinafter more fully described. A gas burner 62 of the manifold supplies pressurized and heated products of combustion to a mixing chamber 64 from which the pressurized and heated products of combustion are fed through main conduits 66 and secondary conduits 68 to the gas jet pumps 60. Each gas jet pump 60 has a restricted orifice 70 through which the pressurized heated products of combustion are fed to provide a primary gas flow as illustrated by arrow 72. This primary gas flow induces a secondary gas flow of the returned exhaust gas as illustrated by arrow 74 to provide a mixed gas flow 76 that is fed through an associated outlet member 78 of the gas jet pump as is hereinafter more fully described.

As shown in FIG. 5, the manifold member 58 includes two pairs of spaced outer and inner side walls 80 and 82. Each pair of spaced side walls 80 and 82 defines a return passage 84 that receives the gas from the exhaust openings via the associated return passage 54 of the platen 42 as shown in FIG. 2. A plurality of the gas jet pumps 60 are mounted on each pair of spaced side walls 80 and 82 and, as previously described, function to mix the pressurized and heated products of combustion received from the gas burner 62 with the gas returned from the exhaust opening for the recirculating flow back to the supply openings. Furthermore, the two pairs of spaced side walls 80 and 82 are spaced from each other to define a mixing plenum 85 in which the pressurized gas is received from opposite directions from the gas jet pumps 60 for mixing prior to being fed to the supply openings 26 through the plenum passages 44 best illustrated in FIG. 4. This mixing chamber 85 is preferably divided by vertical walls 86 spaced along the direction of movement of the glass sheet along the gas support. A pair of the gas jet pumps 60 feed pressurized gas between each pair of vertical walls 86 from opposite directions at upper and lower positions that alternate along the direction of glass sheet movement. Such a construction provides a circular mixing as shown by arrows 87. Any variation in the gas delivery pressure over the lateral width of the gas support due to the upper and lower locations of the two gas jet pumps 60 that feed between each pair of vertical walls 86 is accommodated for by the alternating relationship of these positions along the direction of movement of the glass sheet.

With the embodiment of FIGS. 2 through 5, the glass sheet embodied by strip G is floated by the pressurized gas above the surface 24 of each lower manifold 22 a very small distance, such as about 1 to 2 millimeters, and is spaced below the surface of each upper manifold by a distance that is normally greater than the lower spacing such as two to several times the lower spacing. The extent of each spacing for best results depends upon glass thickness, the speed of conveyance, the temperature involved and other operating parameters.

Figure 6:
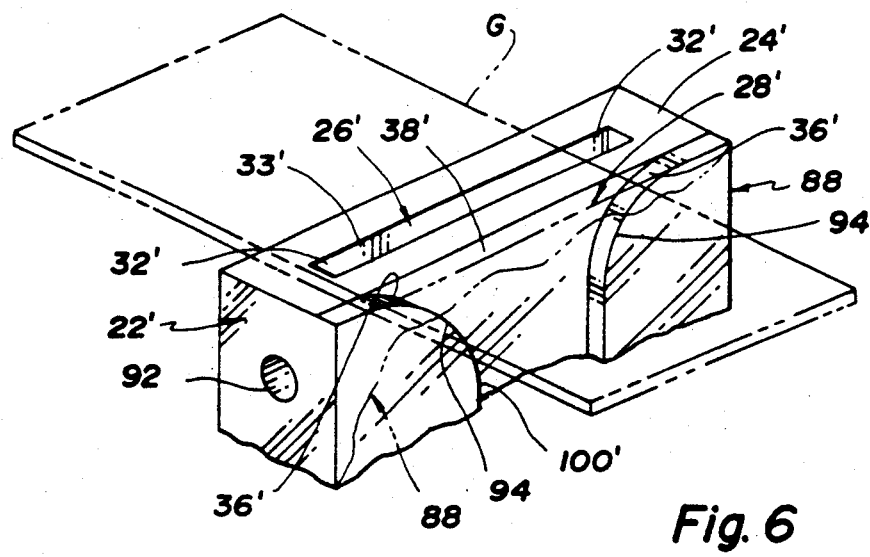
FIG. 6 is a perspective view illustrating another construction of the manifold of the glass sheet gas support.
Figure 7:
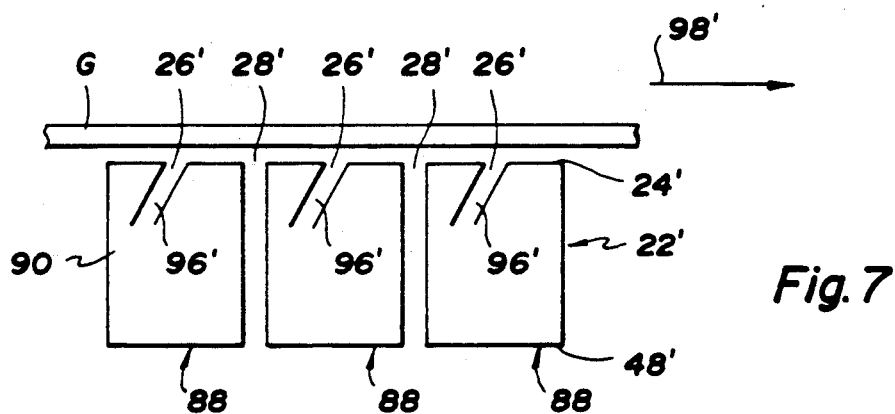
FIG. 7 is a side elevational view that further illustrates the construction of the alternate embodiment of the manifold.
Figure 8:
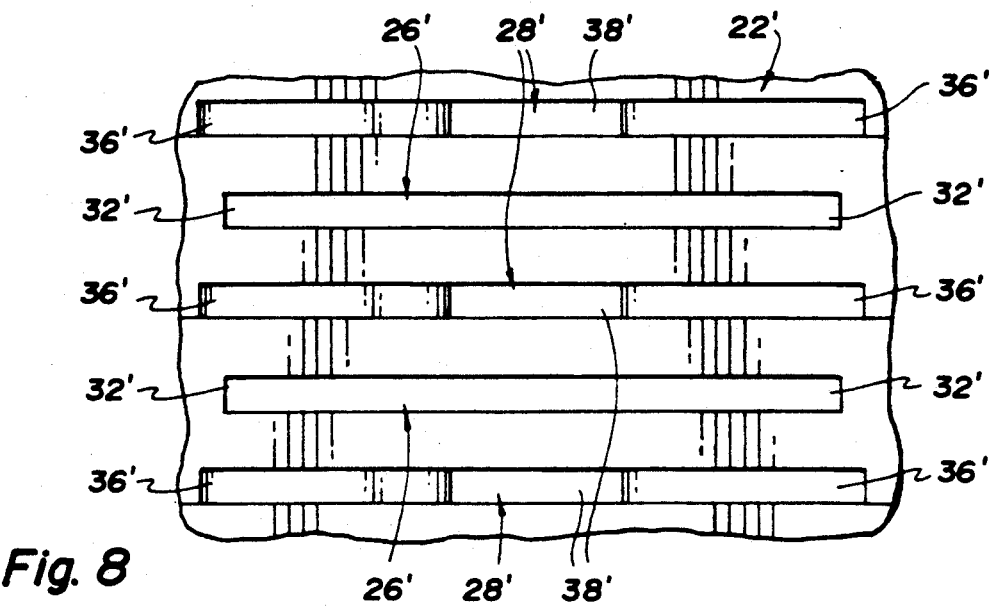
FIG. 8 is a top plan view that further illustrates the construction of the alternate embodiment of the manifold.

With reference to FIGS. 6 through 8, another embodiment of the manifold 22' of the gas support 20 defines the ends 36' of each exhaust opening 28' with progressively increasing depths from its ends 36' toward the central portion 38' thereof to thereby provide the progressively increasing exhaust gas flow areas in opposite directions toward the central portion of the gas exhaust opening. This manifold 22' is preferably fabricated from sheet metal that is constructed as manifold modules 88. Each manifold module 88 includes one supply opening 26', a plenum 90 for feed pressurized gas to its supply opening as shown in FIG. 7, side inlets 92 through which the plenum is supplied pressurized gas to feed the plenum and associated gas supply opening, and a side face having curved walls 94 that cooperate with the flat face of the adjacent manifold module 88 to define an exhaust opening 28'.

Both the manifold embodiment 22 illustrated in FIGS. 2 through 5 and the manifold embodiment 22' illustrated in FIG. 6 through 8 have gas supply passages 96 and 96', respectively that feed the associated gas supply openings 26 and 26' and are inclined in the direction of movement shown by arrow 98 (FIG. 4) and arrow 98' (FIG. 7), which is transverse to the elongated directions of the gas supply and exhaust openings so as to provide conveyance of the glass sheet G supported by the manifold. Thus, the inclined orientation of the supply passages 96 and 96' tends to convey the glass sheet G as well as providing support thereof as previously described. The manifold embodiments 22 and 22' also preferably have exhaust passages 100 and 100' that receive the gas through exhaust openings 28 and 28' for recirculating flow as previously described.

As previously mentioned in connection with FIG. 1, the annealing lehr in addition to including a lower manifold 22 also includes an upper manifold 22 of the same construction as the lower manifold but with the surface thereof that defines the supply and exhaust openings facing downwardly in a spaced and opposed relationship to the upwardly facing surface of the lower manifold. Each of the lower and upper manifolds is constructed as previously described in FIGS. 2 through 5 to include at least one gas jet pump 60 and a gas burner 62 that supplies heated and pressurized products of combustion to the gas jet pump with the gas received from the exhaust openings providing a secondary gas flow that is induced by the primary gas flow to provide a mixed flow of heated and pressurized gas to the supply openings. The lower and upper manifolds 22 of the annealing lehr thus cooperate to support a heated glass sheet embodied by the strip G therebetween in a spaced relationship to the surfaces of the manifold without any direct contact.

While the best modes for carrying out the invention have been described in detail, other designs and embodiments for practicing the invention will be apparent to those familiar to the art to which this invention relates as defined by the following claims.

What is claimed is:

1. A glass sheet gas support comprising: a manifold having an upwardly facing surface including a set of gas supply openings and a set of gas exhaust openings; the gas supply openings feeding pressurized gas upwardly to support a glass sheet above the surface and having elongated slit shapes including opposite ends between which the gas supply openings extend in a parallel relationship to each other and with a generally uniform width; the gas exhaust openings being located between the gas supply openings in an alternating relationship to receive and exhaust pressurized gas fed through the gas supply openings; each gas exhaust opening having an elongated slit shape including opposite ends and a central portion; the gas exhaust openings extending generally parallel to each other and to the gas supply openings; and each gas exhaust opening having exhaust gas flow areas that progressively increase in opposite directions from the ends toward the central portion thereof to thereby prevent gas pressure buildup between the upwardly facing manifold surface and the supported glass sheet at a central location between the ends of the openings.

2. A glass sheet gas support as in claim 1 wherein the manifold defines each gas exhaust opening with progressively increasing widths from its ends toward the central portion thereof to thereby provide the progressively increasing exhaust gas flow areas in opposite directions toward the central portion of the gas exhaust opening.

3. A glass sheet support as in claim 2 wherein the manifold comprises a molded refractory block in which the gas supply and exhaust openings are cast.

4. A glass sheet gas support as in claim 3 wherein the manifold includes a platen that defines the supply and exhaust openings and also includes a manifold member that supplies the pressurized gas to the supply openings and receives the gas from the exhaust openings for recirculating flow.

5. A glass sheet gas support as in claim 4 further including a gas jet pump that provides the recirculating flow of the pressurized gas to and from the supply and exhaust openings 6. A glass sheet gas support as in claim 5 further including a gas burner that supplies pressurized and heated products of combustion to the gas jet pump as a primary gas flow with the gas from the exhaust openings providing a secondary gas flow that is induced by the primary gas flow to provide a mixed flow of heated and pressurized gas to the supply openings.

7. A glass sheet gas support as in claim 6 wherein the manifold member includes two pairs of spaced side walls, each pair of spaced side walls defining a return passage for receiving the gas from the exhaust openings, a plurality of the gas jet pumps mounted on each pair of spaced side walls and functioning to mix the pressurized and heated products of combustion received from the gas burner with the gas returned from the exhaust openings for the recirculating flow back to the supply openings, and the two pairs of spaced side walls being spaced from each other to define a mixing plenum in which the pressurized gas is received from opposite directions from the gas jet pumps for mixing prior to being fed to the supply openings 8. A glass sheet gas support as in claim 1 wherein the manifold defines the ends of each gas exhaust opening with progressively increasing depths from its ends toward the central portion thereof to thereby provide the progressively increasing exhaust gas flow areas in opposite directions toward the central portion of the gas exhaust opening.

9. A glass sheet gas support as in claim 8 wherein the manifold comprises fabricated sheet metal that defines the gas supply and exhaust openings 10. A glass sheet gas support as in claim 1, 2, 7 or 8 whose manifold includes gas supply passages that feed the gas supply openings and are inclined in a conveying direction transverse to the elongated directions of the gas supply and exhaust openings to provide conveyance of a glass sheet supported by the manifold.

11. A glass sheet gas support as in claim 1 which further includes an upper manifold of the same construction as the first mentioned manifold but with the surface thereof that defines the supply and exhaust openings facing downwardly in a spaced and opposed relationship to the upwardly facing surface of the first manifold, each manifold including at least one gas jet pump and a gas burner that supplies heated and pressurized products of combustion to the gas jet pump with the gas received from the exhaust openings providing a secondary gas flow that is induced by the primary gas flow to provide a mixed flow of heated and pressurized gas flow to the supply openings, and the manifolds cooperating to support a heated glass sheet therebetween in a spaced relationship to the surfaces of the manifolds.

12. A glass sheet gas support comprising: a manifold having an upwardly facing surface including a set of gas supply openings and a set of gas exhaust openings; the gas supply openings feeding pressurized gas upwardly to support a glass sheet above the surface and having elongated slit shapes including opposite ends between which the gas supply openings extend in a parallel relationship to each other and with a generally uniform width; the gas exhaust openings being located between the gas supply openings in an alternating relationship to receive and exhaust pressurized gas fed through the gas supply openings; each gas exhaust opening having an elongated slit shape including opposite ends and a central portion; the gas exhaust openings extending generally parallel to each other and to the gas supply openings; each gas exhaust opening having exhaust gas flow areas that progressively increase in opposite directions from the ends toward the central portion thereof to thereby prevent gas pressure buildup between the upwardly facing manifold surface and the supported glass sheet at a central location between the ends of the openings; a gas jet pump that feeds the gas supply openings; and a gas burner that feeds products of combustion to the gas jet pump.

13. A glass sheet gas support comprising: a manifold including a platen having an upwardly facing surface including a set of gas supply openings and a set of gas exhaust openings; the gas supply openings of the platen feeding pressurized gas upwardly to support a glass sheet above the surface and having elongated slit shapes including opposite ends between which the gas supply openings extend in a parallel relationship to each other and with a generally uniform width; the gas exhaust openings of the platen being located between the gas supply openings in an alternating relationship to receive and exhaust pressurized gas fed through the gas supply openings; each gas exhaust opening having an elongated slit shape including opposite ends and a central portion; the gas exhaust openings extending generally parallel to each other and to the gas supply openings; each gas exhaust opening having progressively increasing widths in opposite directions from its ends toward the central portion thereof to thereby provide a greater central exhaust area that prevents gas pressure buildup between the upwardly facing manifold surface and the supported glass sheet at a central location between the ends of the openings; and the manifold also including a manifold member that supplies a recirculating flow of pressurized gas to the supply openings.

14. A glass sheet gas support comprising: a manifold including a platen having an upwardly facing surface including a set of gas supply openings and a set of gas exhaust openings; the gas supply openings of the platen feeding pressurized gas upwardly to support a glass sheet above the surface and having elongated slit shapes including opposite ends between which the gas supply openings extend in a parallel relationship to each other and with a generally uniform width; the gas exhaust openings of the platen being located between the gas supply openings in an alternating relationship to receive and exhaust pressurized gas fed through the gas supply openings; each gas exhaust opening having an elongated slit shape including opposite ends and a central portion;

the gas exhaust openings extending generally parallel to each other and to the gas supply openings; each gas exhaust opening having progressively increasing widths in opposite directions from its ends toward the central portion thereof to thereby provide a greater central exhaust area that prevents gas pressure buildup between the upwardly facing manifold surface and the supported glass sheet at a central location between the ends of the openings; the manifold also including a cast refractory manifold member that has a mixing plenum for feeding the supply openings and at least one return passage for receiving gas from the exhaust openings; a plurality of gas jet pumps mounted on the manifold member to feed pressurized gas to the mixing chamber in a recirculating flow from the exhaust openings via the return passage; and a gas burner that feeds heated products of combustion to the gas jet pumps.

* * * * *